United States Patent
Sailer (10) Patent No.: US 7,263,630 B2
(45) Date of Patent: Aug. 28, 2007

(54) FAULT TOLERANT COMPUTER CONTROLLED SYSTEM

(75) Inventor: Thomas Michael Sailer, Zurich (CH)

(73) Assignee: Supercomputing System AG, Welschenrohr (CH)

( * ) Notice: Subject to any disclaimer, the term of this patent is extended or adjusted under 35 U.S.C. 154(b) by 477 days.

(21) Appl. No.: 10/763,507

(22) Filed: Jan. 23, 2004

(65) Prior Publication Data

US 2004/0195460 A1    Oct. 7, 2004

(30) Foreign Application Priority Data

Jan. 23, 2003    (EP)    ................... 03001308

(51) Int. Cl.
*G06F 11/00*    (2006.01)

(52) U.S. Cl. .......................... 714/11; 700/79
(58) Field of Classification Search .................. 714/11, 714/12; 700/21, 82; 701/43; 370/216
See application file for complete search history.

(56) References Cited

U.S. PATENT DOCUMENTS

| | | | | |
|---|---|---|---|---|
| 4,532,630 A | * | 7/1985 | Corney ....................... | 714/821 |
| 4,644,538 A | * | 2/1987 | Cooper et al. ................ | 714/10 |
| 4,667,284 A | * | 5/1987 | Asami ......................... | 700/82 |
| 5,357,425 A | * | 10/1994 | Minto ......................... | 700/73 |
| 5,648,898 A | * | 7/1997 | Moore-McKee et al. ..... | 700/86 |
| 6,085,350 A | * | 7/2000 | Emmert et al. ............. | 714/797 |
| 6,883,065 B1 | * | 4/2005 | Pittelkow et al. ........... | 711/114 |

FOREIGN PATENT DOCUMENTS

WO    130652 A1    5/2001

OTHER PUBLICATIONS

L. Lamport et al, The Byzantine Generals Problem, ACM Transactions on Programming Languages and Systems, vol. 4, No. 3, Jul. 1982, pp. 382-401.
F.B.Schneider, Understanding Protocols for Byzantine Clock Synchronization, place of publication unknown, dated Aug. 1987.
J. Lala, A Byzantine Resilient Fault Tolerant Computer for Nuclear Power Plant Application, International Symposium on Fault Tolerant Computing Systems, Vienna, Jul. 1-4, 1986.
K. Echtle, Fault-Masking with Reduced Redundant Communication, International Symposium on Fault Tolerant Computing Systems, Vienna, Jul. 1-4, 1986.

* cited by examiner

*Primary Examiner*—Gabriel Chu
*Assistant Examiner*—Paul F. Contino
(74) *Attorney, Agent, or Firm*—Greer Burns & Crain Ltd (57) ABSTRACT

An error tolerant computer controlled system comprises several computers working redundantly and controlling actuators based on signals from sensors and input devices. Each data item emitted by each computer is simultaneously sent through differing communication paths to each actuator, such that in normal operation each actuator receives each data item through several paths. This system continues to function properly even in case of a failure without requiring any re-routing of the data items, which makes it easier to design, analyze and test and thereby increases its reliability.

26 Claims, 4 Drawing Sheets

FAULT TOLERANT COMPUTER CONTROLLED SYSTEM

CROSS REFERENCE TO RELATED APPLICATIONS

This application claims the priority of European patent application 03001308.0, filed Jan. 23, 2003, the disclosure of which is incorporated herein by reference in its entirety.

BACKGROUND OF THE INVENTION

The present invention relates to a fault tolerant computer controlled system as it can e.g. be used for controlling a vehicle or other critical device.

As computer systems gain increasing significance in many applications of human life, their reliability becomes more and more important because a failure may have dire consequences, including injury or casualties. Example of such computer systems are vehicle guidance or control systems, such as train guidance or aircraft control systems, as well as medical systems.

Typical "mean times between failure" of electronic computers are in the order of $10^4$ hours, which is unacceptably high for critical applications. Hence, it has been common practice to use several computers in a parallel, redundant operation in order to increase reliability.

Conventional redundant systems generally use a plurality of computers, which act as data sources in a network. The network consists of a plurality of communication links, each of which connects one computer with a data receiver, such as an actuator for a flap in an aircraft. The computers generate data items containing commands for the flap's operation. The flap receives all data items and combines them for generating an error tolerant data item, e.g. by determining a median value.

This type of system is unable to transmit data items upon failure of a communication link. To overcome this, it has been suggested to interconnect the computers using additional communication links. In case a communication link between a given computer and a data receiver is found to fail, the data items from the given computer are re-routed to other computers and an alternative communication link. As systems of this type may contain a large number of computers and receivers and even a larger number of communication links, the required steps for re-routing the data items upon failure of a communication link may become fairly complex. Also, analysis and testing of the system for all possible failures and re-routing configurations becomes very complicated and expensive if not impossible.

BRIEF SUMMARY OF THE INVENTION

Hence, it is a general object of the invention to provide a method and system of the type mentioned above that is easier to implement, to analyze and to test while maintaining a low risk of failure.

Now, in order to implement these and still further objects of the invention, which will become more readily apparent as the description proceeds, the error tolerant computer controlled system comprises a plurality of redundant data sources generating at least partially redundant data items, a plurality of data receivers for receiving the redundant data items and combining them to an error tolerant data item, a switching assembly with a plurality of inputs and outputs, wherein each input is connected to one data source or to one output and wherein each output is connected to one input or to one data receiver, and wherein each data receiver is connected via separate receiver communication links to at least two outputs, wherein said switching assembly is adapted to connect any of said data sources to each of said data receivers over at least two different receiver communication links, and wherein said computer controlled system is adapted to send every data item from any given data source to any given data receiver through every one of the at least two different receiver communication links such that the given data receiver receives the same data item through at least two receiver communication links.

Hence, according to the invention, data is fed into the receiver communication links from the outputs of a switching assembly. The switching assembly has several inputs, each of which is connected to a data source or to another output. The switching assembly is able to connect each data source to each data receiver over at least two different receiver communication links. The whole system is adapted to send every data item from any given data source to any given data receiver through every one of the at least two different receiver communication links such that the given data receiver receives the same data item through at least two receiver communication links.

In normal operation, each data receiver receives every data item at least twice through separate communication links. Even though this requires additional bandwidth, it has the advantage that no re-routing of data items is required if a fault in a communication link occurs, i.e. the flow of information does not have to be rearranged when a failure occurs, which makes the system more reliable and easier to analyze and to test. It is easy to predict what kind of failures the system is able to handle and there is no need to test all possible combinations of potential failures.

In another aspect, the present invention relates to an error tolerant computer controlled system comprising a plurality of redundant data sources generating at least partially redundant data items, a plurality of data receivers for receiving the redundant data items and combining them to an error tolerant data item, a switching assembly with a plurality of inputs and outputs, wherein each input is connected to one data source or to one output and wherein each output is connected to one input or to one data receiver, and a plurality of receiver communication links, wherein each data receiver is connected via separate receiver communication links to at least two outputs and wherein the number of receiver communication links for each data receiver is smaller than the number of data sources wherein said switching assembly is adapted to connect any of said data sources to each of said data receivers over at least two different receiver communication links, and wherein said computer controlled system is adapted to send every data item from any given data source to any given data receiver through every one of the at least two different receiver communication links such that the given data receiver receives the same data item through at least two receiver communication links.

In yet another aspect, the invention relates to an error tolerant computer controlled system comprising a plurality of redundant data sources generating at least partially redundant data items, a plurality of data receivers for receiving the redundant data items and combining them to an error tolerant data item, a switching assembly comprising a plurality of switching units, each switching unit having a plurality of inputs and a plurality of outputs, wherein each input of each switching unit is either connected to one data source or via a switch communication link to one output of another switching unit, wherein each switching unit is connected via at least two switch communication links to other switching units, wherein each switch communication link connects one output to one input, and wherein each data receiver is connected via receiver communication links to at least two different switching units, wherein said switching assembly is adapted to connect any of said data sources to each of said data receivers over at least two different receiver communication links, and wherein said computer controlled system is adapted to send every data item from any given data source to any given data receiver through every one of the at least two different receiver communication links such that the given data receiver receives the same data item through at least two receiver communication links.

Hence, in this aspect, the switching assembly is divided into a plurality of switching units, wherein each switching unit is connected via at least two switch communication links to other switching units and wherein each data receiver is connected to at least two different switching units. Subdividing the switching assembly in this way provides improved performance if any one of the switching units should fail. In an advantageous embodiment, exactly one switching unit is attributed to each data source and, preferably, one input of each switching unit is connected an output of its data source.

In another aspect, the invention relates to an error tolerant computer controlled system comprising a plurality of redundant data sources generating at least partially redundant data items, a plurality of data receivers for receiving the redundant data items and combining them to an error tolerant data item, a switching assembly with a plurality of inputs and outputs, wherein each input is connected to one data source or to one output and wherein each output is connected to one input or to one data receiver, and wherein each data receiver is connected via separate receiver communication links to at least two outputs, wherein said switching assembly is adapted to connect any of said data sources to each of said data receivers over at least two different receiver communication links, and wherein said computer controlled system is adapted to send every data item from any given data source to any given data receiver through every one of the at least two different receiver communication links such that the given data receiver receives the same data item through at least two receiver communication links, and wherein repetitive time windows are attributed to each data source and wherein, in each time window, the switching assembly connects all receiver communication links to the data source attributed to the time window while disconnecting the remaining data sources from the receiver communication links.

In this aspect, a synchronous transmission scheme is used where repetitive time windows are attributed to each data source. In each time window, the switching assembly connects all receiver communication links to the data source attributed to the time window. This again leads to an increase of required bandwidth, but it helps to keep the system simple. In addition to this, it prevents a faulty data source from jamming a receiver communication link continuously because each data source only has access to the communication link during its data window. If the switching assembly is divided into switching units connected as mentioned above, the same scheme can be used for preventing a jamming of the switch communication links.

In another advantageous embodiment, a unique key is attributed to each data source. The data items sent by each source are digitally signed by the corresponding key, and the signature is checked upon receipt of the data item in a data receiver. Using such a signature scheme provides a further possibility for detecting corrupted messages.

The present invention is particularly suited for controlling the direction and/or velocity of vehicles. In an advantageous application, it is used for controlling an aircraft. Hence, the invention is also directed to an aircraft comprising an error tolerant computer system as described above.

Other advantageous embodiments are described in the dependent claims.

BRIEF DESCRIPTION OF THE DRAWINGS

The invention will be better understood and objects other than those set forth above will become apparent when consideration is given to the following detailed description thereof. Such description makes reference to the annexed drawings, wherein.

DETAILED DESCRIPTION OF THE INVENTION

Figure 1:
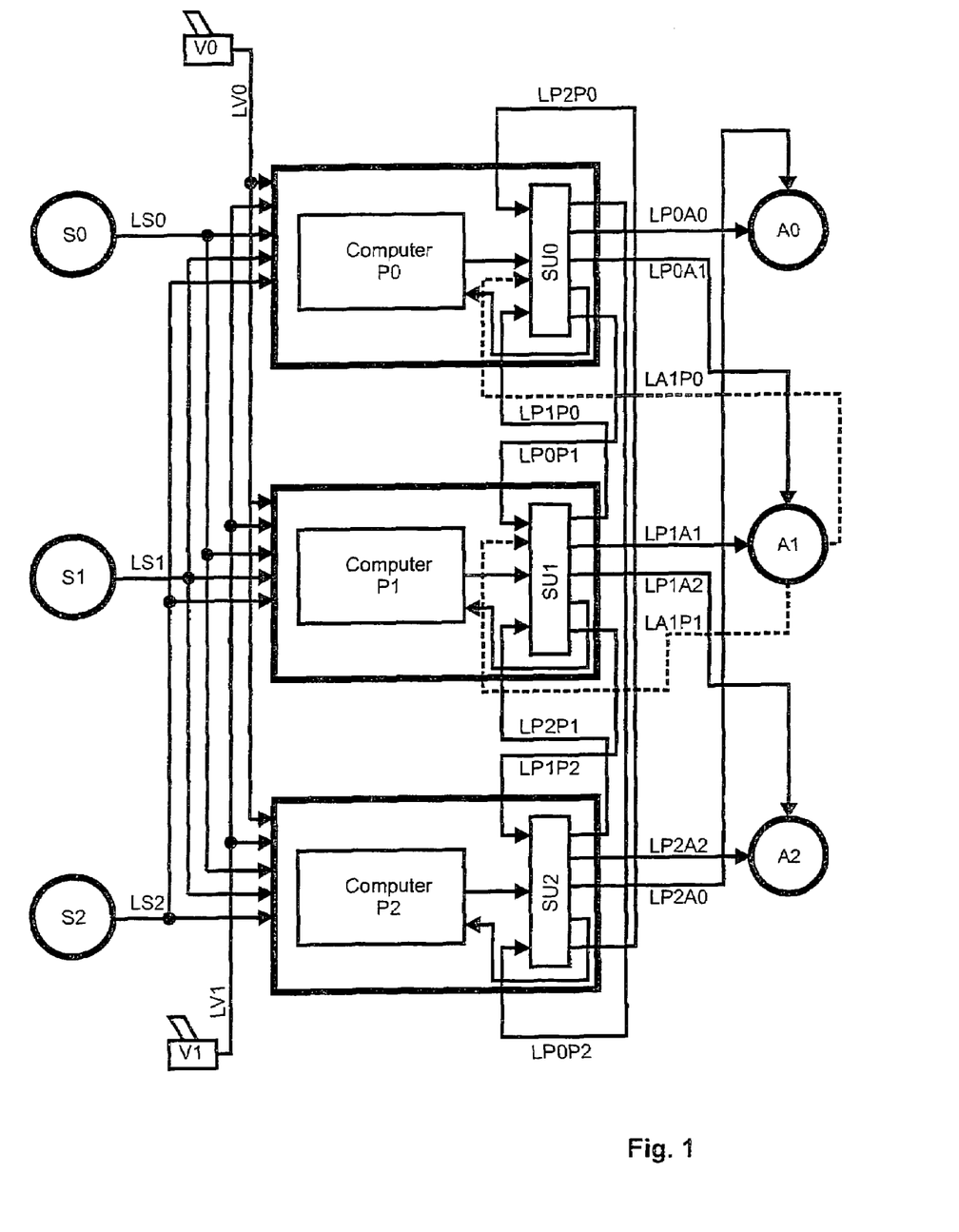
FIG. 1 is a block diagram of a fault tolerant computer system according to the present invention.

The system of FIG. 1 is operated by three redundant computers P0, P1 and P2, which process the signals from three sensors S0, S1 and S2 and two input devices V0, V1 and control three actuators A0, A1 and A1. One switching unit SU0, SU1, SU2 is attributed to each computer.

In a specific embodiment, the system shown here may control a vehicle, where the sensors S0, S1, and S2 e.g. measure the vehicle's position, attitude and/or velocity, the input devices V0 and V1 are controls operated by the user, and A0, A1 and A2 are actuators controlling the vehicle's drive and steering mechanism.

For reliability reasons, there are at least two redundant sensors for measuring each parameter used by the computers P0, P1, P2, and the input devices LV0, LV1 are provided in duplicate.

The computers P0, P1 and P2 generate commands for the actuators A0, A1, A2 as a function of the input provided by the sensors S0, S1 and S2 and the input devices LV0, LV1 as well as of state variables stored in the computers. The computers P0, P1 and P2 work independently. They are redundant, i.e. the commands generated by the computers are, in the absence of a system fault, ideally identical and therefore redundant. The commands are sent as data items to the actuators A0, A1, A2. The latter combine the received redundant data items in order to determine an error corrected data item. This is described in more detail below.

It must be noted that for most applications the corresponding number of components will be larger than shown in FIG. 1. However, the architecture of the present system can be scaled easily to meet the requirements of systems of any complexity.

In the following, this architecture is described in more detail. In this description, each computer P0, P1, P2 (or, more accurately, its output connected to the switching unit) is regarded as a "data source" sending data items to be received by the actuators A0, A1, A2. Each actuator A0, A1, A2 is regarded as a "data receiver" receiving the data items.

A plurality of communication links is provided for connecting the individual parts of the system. Input communication links LS0, LS1, LS2, LV0, and VL1 connect each sensor S0, S1, S2 and each input device V0, V1 to each computer P0, P1, P2. Switch communication links LPiPj interconnect the individual switching units SU0, SU1, SU2 (where i and j are integers between 0 and the number of switching units minus one). Receiver communication links LPiAk connect each switching unit SUi to the data receivers Ak (where k is an integer between 0 and the number of actuators minus 1). Each data receiver Ak is connected to at least two receiver communication links LPiAk leading to different switching units SUi.

Each switch communication link LPiPj is a point to point connection and connects one output of a switching unit SUi to one input of another switching unit SUj. Similarly, each receiver communication link LPiAk is a point to point connection connecting one output of a switching unit Si to one actuator Ak.

Preferably, the receiver communication links LPiAk are optical cables for reliable data transmission and safe galvanic protection of the remaining system because in many applications the actuators will operate high power equipment. The other communication links may be optical fibers, electric wires or radio links or others.

Figure 2:
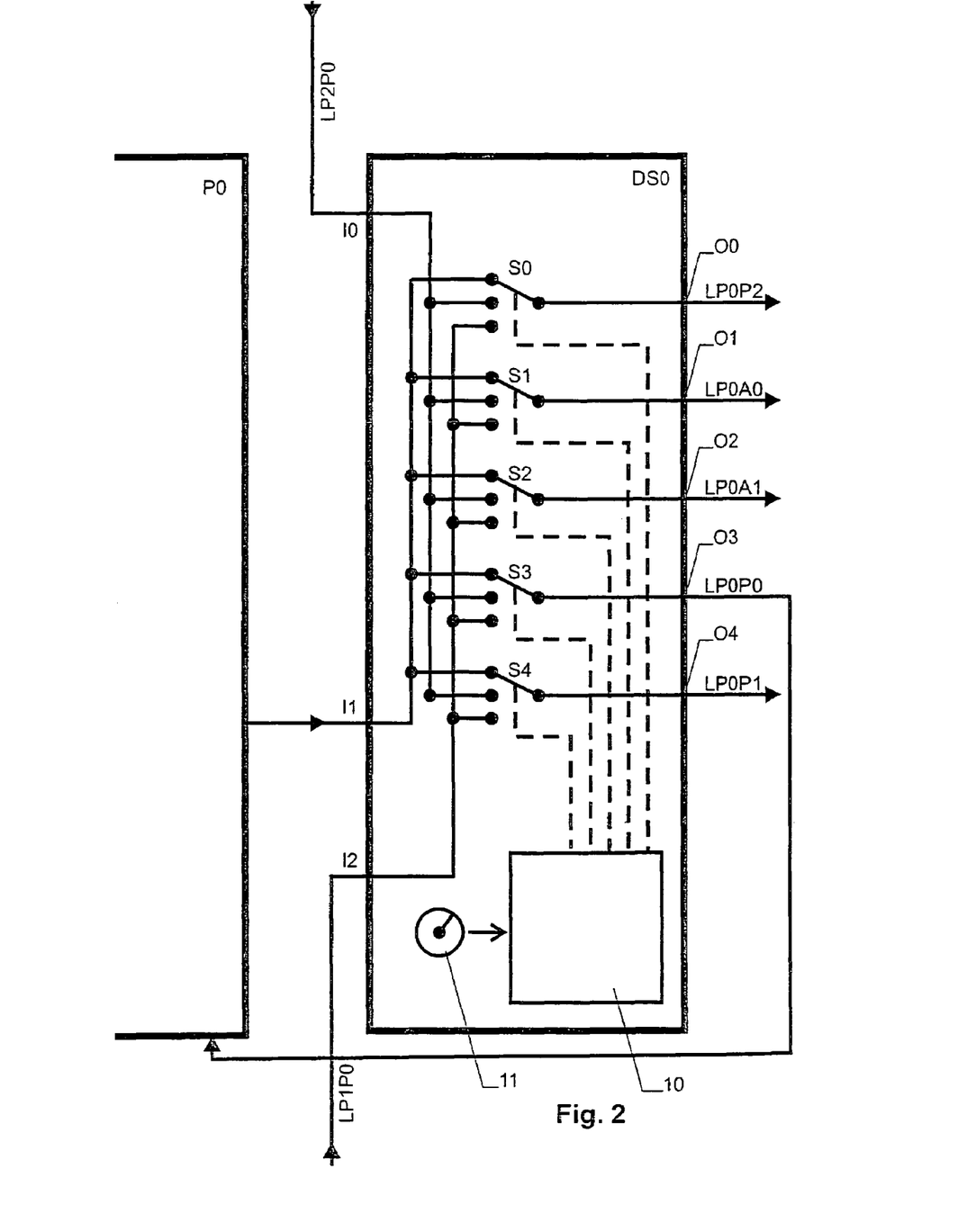
FIG. 2 shows a switching unit of one data source.

The architecture of the switching units SU0, SU1, SU2 is illustrated in FIG. 2. In the shown embodiment each switching unit SUi has three inputs I0-I2 and five outputs O0-O4. One switch (demultiplexer) S0-S4 is provided for each output so that each output Oi can be selectively connected to any one of the inputs Ij.

Inputs I0 and I2 are each connected to a switch communication link LPjLPi, LPj'LPi receiving data items from two other switching units SUj and SUj'. Input I1 is connected to the data source attributed to the switching unit.

Outputs O0 and O4 are each connected to a switch communication link LPiLPj, LPiLPj' for sending data items to two other switching units SUj and SUj'. Outputs O1 and O2 are connected to receiver communication links LPiAk and LPiAk' for sending data items to receivers Ak and Ak'. Output O3 is connected to a data input of the computer attributed to the switching unit.

A switch control table 10 is provided for setting the switches Si in accordance with signals from a clock unit 11.

Each switching unit SU0, SU1, SU2 is provided with its own clock unit 11 and its own table 10 in order to be able to set the switches autonomously. The clock units 11 are kept synchronized. Various fault tolerant methods for keeping clocks synchronized are known to the person skilled in the art, some of which are described by Fred. B. Schneider in "Understanding Protocols for Byzantine Clock Synchronization", August 1987, Dept. of Computer Science, Cornell University. Preferably, the clock units 11 are synchronized by time stamps added by the data sources to each or at least part of the data items, wherein each switching unit extracts the time stamp of passing data items from different data sources and determines a global time therefrom, e.g. by finding a median of the time stamps received at one time and by calculating a deviation in respect to its own clock.

Figure 3:
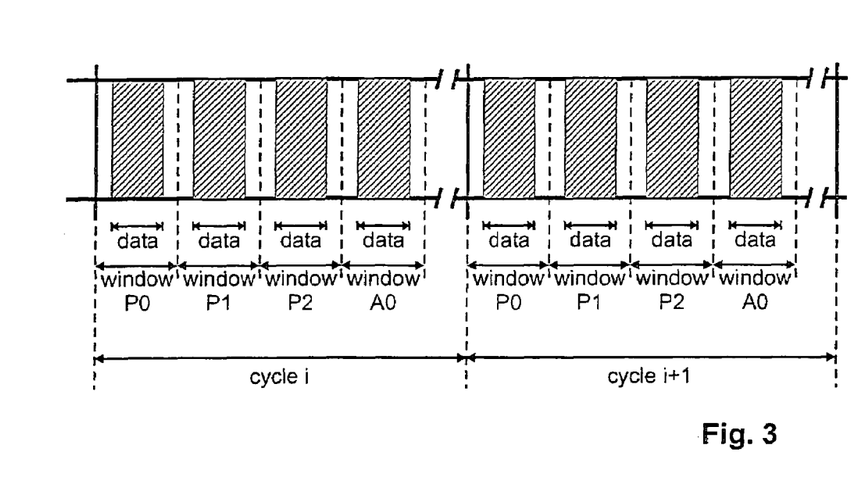
FIG. 3 is a timing schedule for data communication.

For regulating communication in the system, a time window is attributed to each data source, wherein the windows are preferably of equal length and are repeated at regular cycles as shown in FIG. 3. Data windows of unequal length may also be used, in particular if one of the data sources has a larger amount of data to transmit. In a given time window, the switching units SUi set the switches in such a way that all switch communication links LPiPj as well as all receiver communication links LPiAk are connected to the data source the window is attributed to.

As can be seen from FIG. 3 and as will be explained further below, additional time windows may be provided for transmissions from the actuators Ai.

The data sources are also being synchronized, e.g. through the clock units of their attributed data switches, and only send data items within their data windows, wherein a leading and trailing end of each data window remains unused in order to account for synchronization mismatch and signal delays.

The lengths of the windows in FIG. 3 primarily depends on the amount of data to be transported and the maximum allowable time delay for transmitting a message. For most vehicle control systems, a window length in the order of 10 ms is found to be appropriate.

Using a fixed timing scheme for globally attributing the communication links to a single data source at a time leads to an increase in bandwidth requirements. However, in many applications, presently available communication links provide ample bandwidth for supporting this type of protocol.

As it becomes clear from the above, each data source Pi sends all its data items to all data receivers Ak simultaneously, and each data receiver receives every data item through at least two different receiver communication links LPjAk simultaneously. Hence, in normal operation, the data receiver receives each data item from each data source at least twice, and because all data sources are generating redundant data items, the data receiver receives a group of six redundant versions of each data item through different paths of the network.

Figure 4A:
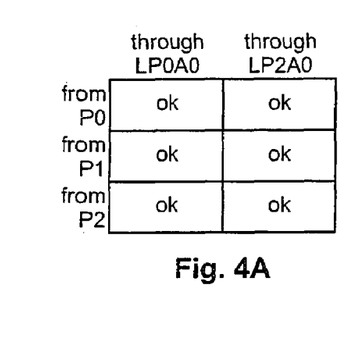
FIGS. 4A, 4B, 4C are tables of redundant data items received by a data receiver.
Figure 4B:
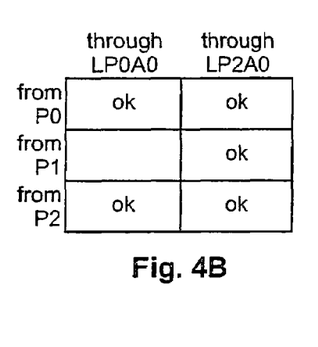
Figure 4C:
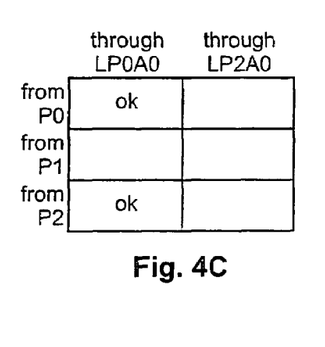

This is illustrated for data receiver A0 in FIGS. 4A, 4B and 4C. The data receiver tries to receive all six data items of the group and can verify their physical integrity, e.g. by verifying a check sum or a digital signature as described below. In the absence of any error in transmission, each data item is flagged as "ok" as shown in FIG. 4A. In case of a failure of communication link LP1P0, only five data items are valid, FIG. 4B. Even if, in addition to this, communication link LP2A0 fails, two data items are still valid, FIG. 4C.

From the valid received redundant data items, the data receiver generates an error corrected data item using known permutation-invariant techniques (median, majority, . . . ). For example, if the data items specify a numerical parameter, the median value of the parameter given by the valid data items is determined.

As mentioned above, the data items can comprise a digital signature. In order to generate a digital signature (and, optionally, an encryption), a unique key is attributed to each data source P0, P1, P2. Using this unique key, each data source creates a digital signature as known to a person skilled in the art, i.e. a signature value that depends on the message to be transmitted in the data item as well as on the key, wherein the algorithm used for generating the signature is such that it is possible to verify with sufficient reliability if a given signature value was generated using a given key or not. For improved security, signature schemes based on asymmetric keys can be used. It must be noted, however, that the signature schemes that can be used in the context of the present invention may be simpler and less tamper-proof than those generally used in data communication because they primarily have to protect against system failure but not against intentional tampering.

When a data receiver receives a message from a given data source, it checks the validity of the data item by checking if the signature matches the key of the data source. If not, the data item is flagged to be invalid.

Figure 5:
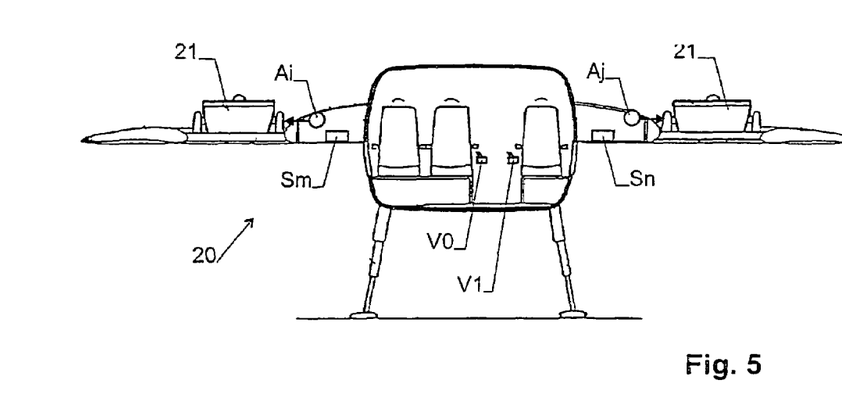
FIG. 5 shows an aircraft controlled by a computer system according to the present invention.

An application of the present system is schematically illustrated in FIG. 5. The figure shows a VTOL aircraft 20 as it is e.g. disclosed in WO 01/30652 with a plurality tiltable drive units 21, each of which comprises an electrically driven fan. The drive units 21 provide attitude control, lift and forward thrust for the aircraft. Each drive unit 21 comprises a drive control unit for controlling its tilt angle and thrust. Each control unit receives its settings from one of the data receivers Aj, Ai described above. In addition to this, attitude sensors Sm, Sn and other types of sensors as well as the input devices V0 and V1 are arranged in the aircraft for providing the computers Pi with input data.

Figure 6:
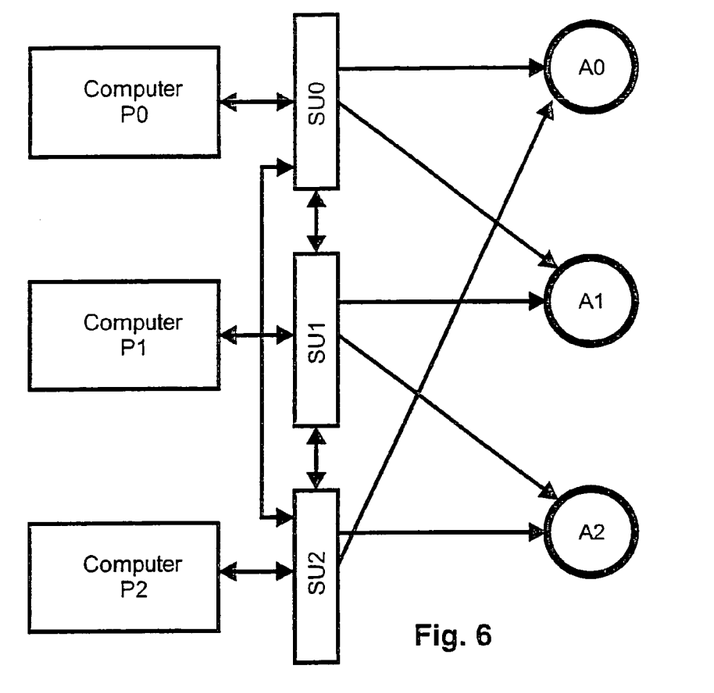
FIG. 6 is a simplified illustration of FIG. 1

In order to discuss some of the many modifications of the present invention, we now refer to FIG. 6, which shows the embodiment of FIG. 1 in schematic manner.

As can be seen from FIG. 6, one of the advantages of the described embodiment of the present invention lies in the fact that each data receiver Ak receives data from all data sources Pi over redundant paths even though the number of receiver communication links LPiAk for a given receiver Ak is smaller (namely 2) than the number of data sources (namely 3). This is due to the fact that the switching units SUi allow each data source Pi to access both receiver communication links of a given data receiver.

The minimum number of receiver communication links to each data receiver is 2 if alternative paths are to be provided for each data item. In order to increase reliability, more than two receiver communication links for each data receiver could be provided.

In the embodiment of FIG. 6, each switching unit SUi is connected for sending and receiving data with two other switching units, thereby providing alternative paths between switching units. For increased reliability, this number can be larger than two, but there may also be only one single switching communication link per switching unit.

In the embodiment of FIG. 6, one switching unit SUi is attributed to each computer Pi. Preferably, each computer and each switching unit are located physically close to each other such that they may share some mechanical or electrical components. However, it is advantageous if the switching unit is able to operate independently of its attributed computer, i.e. when the computer fails in its data processing, the switching unit should still continue to operate.

A close physical placement of the computer and its associated switching unit is advantageous but not required. The switching unit can be placed at an arbitrary position. However, if the distance between a computer and its switching unit becomes large, the risk of failure of the communication links between them increases. In that case it can be advisable to provide an additional redundant communication links between the computer and the switching units.

Figure 7:
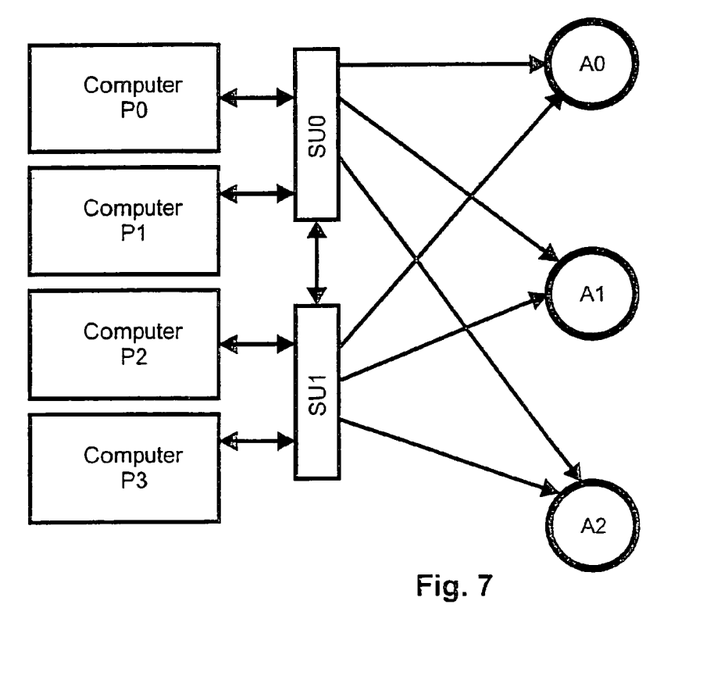
FIG. 7 is an alternative embodiment of the invention.

FIG. 7 illustrates an embodiment with four computers Pi and only two switching units SUj. Here, each switching unit has four inputs and six outputs, and the individual switches S have four possible positions. Again, the switches are positioned according to the data source the current window is attributed to such that the signals of this data source are sent to all receiver communication links and to the switching communication links.

It must be noted that in the above description and the enclosed figures, only the most important ones of the communication links between the components are described and shown. In addition to this, the network may comprise further communication links, e.g. from the actuators back to the computers or to a separate monitoring unit. Similarly, the switching unit may comprise, in addition to switches connected to the receiver communication links and the switching communication links, additional switches for feeding data to other types of receivers, such as the switches S3 for feeding data items to the inputs of the computers.

For example, if it is desired that the actuators A0, A1, A2 are able to send feedback to the computers P0, P1, P2, the communication links between the switching units SUi and the actuators may be bidirectional. For example, a feedback link LAiPk may lead from each actuator to the two switching units it is connected to, such as it is shown in dashed lines for actuator A1 in FIG. 1. The number of inputs to the switches S0-S4 in each switching unit would correspondingly be increased by two, such that they are able connect the feedback links LAiPk to the outputs of the switching units during time windows attributed to the actuators (see FIG. 3). In other words, actuators A0, A1, A2 can also act as data sources. However, in contrast to computers P0, P1 and P2, they are generally not redundant data sources, but they can transmit the data over redundant paths to the selected receivers.

The term "system" as used here is understood to designate an apparatus comprising data sources and data receivers as well as the network connecting them, but it is also used to designate a method for operating such an apparatus.

While there are shown and described presently advantageous embodiments of the invention, it is to be distinctly understood that the invention is not limited thereto but may be otherwise variously embodied and practised within the scope of the following claims.

The invention claimed is:

1. An error tolerant computer controlled system comprising
   a plurality of redundant data sources generating redundant data items,
   a plurality of data receivers for receiving the redundant data items and combining them to an error tolerant data item,
   a switching assembly with a plurality of inputs and outputs, wherein each input of the switching assembly is connected to one data source or to one output of the switching assembly and wherein each output is connected to one input of the switching assembly or to one data receiver, and wherein each data receiver is connected via separate receiver communication links to at least two outputs of the switching assembly,
   wherein said switching assembly is adapted to connect any of said data sources to each of said data receivers over at least two different receiver communication links, and wherein said computer controlled system is adapted to send every data item from any given data source to any given data receiver through every one of the at least two different receiver communication links such that the given data receiver receives the same data item through at least two receiver communication links, and wherein the switching assembly is divided into a plurality of switching units, wherein each input of each switching unit is either connected to one data source or via a switch communication link to one output of another switching unit, wherein each switching unit is connected via at least two switch communication links to other switching units, wherein each switch communication link connects one output of one switching unit to one input of another switching unit, and wherein each data receiver is connected via the receiver communication links to at least two different switching units.

2. The system of claim 1 wherein each receiver communication link connects exactly one output to exactly one receiver.

3. The system of claim 1 wherein the number of receiver communication links for each data receiver is smaller than the number of data sources.

4. The system of claim 3 wherein the number of receiver communication links for each data receiver is 2.

5. The system of claim 1 wherein, for each switching unit, each output can be connected to each input.

6. The system of claim 1 wherein exactly two switch communication links are attached to the inputs of each switching unit or wherein exactly two switch communication links are attached to the outputs of each switching unit.

7. The system of claim 1 wherein the number of switching units corresponds to the number of data sources and wherein each switching unit is attributed to one data source, and wherein one input of each switching unit is connected to its attributed data source.

8. The system of claim 7 wherein one output of the switching unit is connected to its attributed data source.

9. The system of claim 1 wherein repetitive time windows are attributed to each data source and wherein, in each time window, the switching assembly connects all receiver communication links to the data source attributed to the time window while disconnecting the remaining data sources from the receiver communication links.

10. The system of claim 9 wherein the switching assembly is divided into a plurality of switching units, wherein each input of each switching unit is either connected to one data source or via a switch communication link to one output of another switching unit, wherein each switching unit is connected via at least two switch communication links to other switching units, wherein each switch communication link connects one output to one input, and wherein each data receiver is connected via the receiver communication links to at least two different switching units, and wherein, in each time window, the switching assembly is adapted to connect all switch communication links to the data source attributed to the time window while disconnecting the remaining data sources from the switch communication links.

11. The system of claim 9 wherein at least part of the data items carries a time stamp and wherein each switching unit comprises a clock synchronized by the time stamps.

12. The system of claim 11 wherein each switching unit is adapted to combine a plurality of received data items carrying time stamps in order to determine a time base.

13. The system of claim 11 wherein each switching unit is adapted to combine a plurality of received data items carrying time stamps in order to determine a time base by determining a median of the time stamps of data items from different data sources.

14. The system of claim 1 wherein a unique key is attributed to each data source and each data source is adapted to generate a digital signature for each data item it sends using its unique key, and wherein the data receivers are adapted to check a validity of the signature upon receipt of a data item.

15. The system of claim 1 wherein each of said data receivers is adapted to check a validity of each of the received data items and to use only those data items of a group of redundant data items that are valid.

16. The system of claim 15 wherein each of said data receivers is adapted to determine a median or majority value of the valid data items of the group of redundant data items.

17. The system of claim 1 wherein said data receivers comprise actuators.

18. The system of claim 1 further comprising feedback links for transmitting data from said data receivers to said switching assembly.

19. A vehicle comprising the system of claim 1, wherein said data receivers control a drive and steering mechanism of the vehicle.

20. An aircraft comprising the system of claim 1.

21. The aircraft of claim 20 comprising at least one pivotal drive unit for attitude control and for generating lift and forward thrust, and a drive control unit for controlling a tilt angle and a thrust of said drive unit, wherein said control unit is controlled by one of said data receivers.

22. The aircraft of claim 21 wherein said drive unit is driven by an electrical motor.

23. An error tolerant computer controlled system comprising a plurality of redundant data sources generating redundant data items, a plurality of data receivers for receiving the redundant data items and combining them to an error tolerant data item, a switching assembly with a plurality of inputs and outputs, wherein each input is connected to one data source or to one output of the switching assembly and wherein each output of the switching assembly is connected to one input of the switching assembly or to one data receiver, and a plurality of receiver communication links, wherein each data receiver is connected via separate receiver communication links to at least two outputs of the switching assembly and wherein the number of receiver communication links for each data receiver is smaller than the number of data sources, and wherein said switching assembly is adapted to connect any of said data sources to each of said data receivers over at least two different receiver communication links, and wherein said computer controlled system is adapted to send every data item from any given data source to any given data receiver through every one of the at least two different receiver communication links such that the given data receiver receives the same data item through at least two receiver communication links.

24. An error tolerant computer controlled system comprising a plurality of redundant data sources generating redundant data items, a plurality of data receivers for receiving the redundant data items and combining them to an error tolerant data item, a switching assembly comprising a plurality of switching units, each switching unit having a plurality of inputs and a plurality of outputs, wherein each input of each switching unit is either connected to one data source or via a switch communication link to one output of another switching unit, wherein each switching unit is connected via at least two switch communication links to other switching units, wherein each switch communication link connects one output of one switching unit to one input of another switching unit, and wherein each data receiver is connected via receiver communication links to at least two different switching units, and wherein said switching assembly is adapted to connect any of said data sources to each of said data receivers over at least two different receiver communication links, and wherein said computer controlled system is adapted to send every data item from any given data source to any given data receiver through every one of the at least two different receiver communication links such that the given data receiver receives the same data item through at least two receiver communication links.

25. The error tolerant computer controlled system of claim 24 wherein, for each switching unit, each output can be connected to each input.

26. An error tolerant computer controlled system comprising
a plurality of redundant data sources generating redundant data items,
a plurality of data receivers for receiving the redundant data items and combining them to an error tolerant data item,
a switching assembly with a plurality of inputs and outputs, wherein each input of the switching assembly is connected to one data source or to one output of the switching assembly and wherein each output of the switching assembly is connected to one input of the switching assembly or to one data receiver, and wherein each data receiver is connected via separate receiver communication links to at least two outputs of the switching assembly,
wherein said switching assembly is adapted to connect any of said data sources to each of said data receivers over at least two different receiver communication links, and wherein said computer controlled system is adapted to send every data item from any given data source to any given data receiver through every one of the at least two different receiver communication links such that the given data receiver receives the same data item through at least two receiver communication links, and
wherein repetitive time windows are attributed to each data source and wherein, in each time window, the switching assembly connects all receiver communication links to the data source attributed to the time window while disconnecting the remaining data sources from the receiver communication links.

* * * * *